United States Patent [19]

Jalon

[11] Patent Number: 4,655,788

[45] Date of Patent: Apr. 7, 1987

[54] SECURITY FIBERS AND OTHER MATERIALS MADE LUMINESCENT BY A DYEING PROCESS, PROCESSES FOR THEIR MANUFACTURE AND THEIR APPLICATIONS

[76] Inventor: Michel Jalon, 19, Ave. du General LeClerc, Paris, France

[21] Appl. No.: 746,671

[22] Filed: Jun. 20, 1985

[30] Foreign Application Priority Data

Jun. 22, 1984 [FR] France ............................... 84 09807

[51] Int. Cl.[4] .............................................. C09B 69/10
[52] U.S. Cl. ........................................................ 8/648
[58] Field of Search ............................................ 8/648

[56] References Cited

U.S. PATENT DOCUMENTS

| | | | |
|---|---|---|---|
| 3,473,027 | 10/1969 | Freeman et al. | 250/71 |
| 4,451,521 | 5/1984 | Kaule et al. | 428/199 |
| 4,451,530 | 5/1984 | Kaule et al. | 428/323 |

FOREIGN PATENT DOCUMENTS

| | | |
|---|---|---|
| 0066854 | 12/1982 | European Pat. Off. . |
| 516196 | 3/1971 | Switzerland . |

*Primary Examiner*—Lorenzo B. Hayes
*Assistant Examiner*—Brooks Alan Truskett
*Attorney, Agent, or Firm*—Finnegan, Henderson, Farabow, Garrett & Dunner

[57] ABSTRACT

The invention relates to security fibers and other allied materials made luminescent by a dyeing process employing rare-earth compounds and their applications in fiduciary documents and other materials requiring authentication.

18 Claims, No Drawings

SECURITY FIBERS AND OTHER MATERIALS MADE LUMINESCENT BY A DYEING PROCESS, PROCESSES FOR THEIR MANUFACTURE AND THEIR APPLICATIONS

The present invention relates to luminscent security fibers, security threads, textile materials, plastic and regenerated cellulose films and plastic resins, processes for their manufacture and their applications in fiduciary documents and other materials.

Security fibers are fibers which are incorporated in fiduciary documents or other materials for the purpose of ensuring an identification, an authentication, a protection against forgery, imitation or falsification. Security threads are continuous threads or strips of film introduced into fiduciary documents for the same purpose as security fibers.

In the present case and in what follows, the expression "fiduciary documents" denotes papers such as papers for bank notes, cheques, shares, bills, stamps, official documents, identity cards, passports, record books, notes, tickets, vouchers, bulletins, accounting books, as well as credit, payment, access or multifunctional cards, and similar documents which necessarily involve a high degree of security.

In the present case the expression "other materials" refers to materials which, in order to combat their forgery, imitation or falsification, require a means of identification, authentication and protection, provided by the incorporation of security fibers in or on these materials.

Security fibers incorporated in these fiduciary documents and other materials can be generally categorized thus:

fibers which are visible in sunlight or artificial light fibers which are visible in sunlight or artificial light and which exhibit fluorescence under ultraviolet rays, fibers which are invisible in sunlight or artificial light but which exhibit fluorescence under ultraviolet rays.

The expression "fibers which are invisible in sunlight or artificial light" means that these fibers which are fluorescent under infrared, ultraviolet or x-rays, have, in sunlight or artificial light, a color which is identical to that which they had before the treatment to which they have been subjected and which has made them fluorescent. In the most general case of the manufacture of a white security paper before its printing, the whitish security fibers are incorporated into the white paper pulp and these fibers are consequently invisible or indistinguishable having the same color as the paper; however, under excitation, for example by ultraviolet rays, these fibers emit a fluorescence, for example in the blue.

The present invention relates to the manufacture of fibers, preferably of the latter group, which are therefore invisible in sunlight or artificial light and which, under excitation by IR, UV, or x-rays, exhibit a luminescence in one or more regions of the IR, visible, UV or x-ray spectrum.

The colorants employed within the scope of this invention are compounds of the rare earths, or lanthanides with atomic numbers of 57 to 71, in which it is usual to include yttrium and thorium, having atomic numbers of 39 and 90 respectively. The rare-earth compounds which have these luminescence characteristics and are employed in this invention are chelates.

In the state of the prior art, the use of very many luminescent lanthanide compounds for the purpose of identification, particularly in fiduciary documents, has been noted in U.S. Pat. Nos. 4,451,521, 3,473,027 and 4,451,530.

When they envisage the use of rare-earth chelates, these patents describe the incorporation of these chelates in inks or varnishes by dissolving, or by incorporation in the bulk of the paper.

When these patents envisage the use of rare earth chelates in security fibers, these patents express only the concept thereof but without providing the method for implementing it. It is found, for example, in U.S. Pat. No. 4,451,530 that "the luminescent substance is represented in the paper by security fibers prepared as a result during the manufacture of the paper". Now, it is known that, on the one hand, the preparation of the security fibers is not carried out during the manufacture of the paper, except for imparting a dye to the bulk of the paper and not to the security fibers and, on the other hand, that the preparation of the real security fibers is an operation which is different and chronologically previous to paper manufacture; this operation is carried out by the dye industries.

The person skilled in the art, in this case the fibre-dyeing specialist, cannot, upon the mere expression of the concept, carry out a dyeing of fibers using these rare-earth luminophors. In point of fact, the process of dyeing with these chelates is not described because the implementation of the concept comes up against a major difficulty; these chelates, introduced into a fibre dye-bath, are insoluble in water and consequently cannot penetrate into the fibers by the usual fibre-dyeing processes.

To overcome this difficulty it has been proposed, particularly in European patent application No. 66,854, to add these chelates to the spinning stock employed for extruding continuous filaments which are subsequently chopped into fibers.

This method of producing security fibers, theoretically satisfactory, is subject to severe constraints in practice; in point of fact, the manufacturers and extruders of continuous filaments, who could incorporate rare-earth chelates in their spinning stock do not wish to alter the composition of their spinning stock for small-scale manufacture, whereas the security fibers obtained from these chopped continuous filaments would represent, taking into account their uses and their cost, only an infinitesimal proportion of the monthly or even daily production of these manufacturers and extruders of continuous filaments.

The present invention offers, therefore, to resolve these difficulties by describing a process for the manufacture of security fibers in which the incorporation of lanthanide, yttrium and thorium chelates is carried out not in the spinning stock for continuous filaments, but by a process of dyeing fibers which are already extruded and chopped into fibers.

Since a dyeing process is involved, this invention has the advantage of having some similarity to the dyeing processes employed by fibre-dyers and thus employing equipment which is virtually standardized in this industry, and of offering the possibility of following manufacturing cycles which are compatible with the small quantities of security fibers employed by the industries which make use of them.

This dyeing process, which makes it possible to dye fibers with rare-earth chelates is carried out in two different manners.

In the first embodiment, the process consists basically in using as a dyeing medium a bath containing a combination of one or more solvents in which the rare-earth chelates employed are soluble, and one or more diluents in which the rare-earth chelates are insoluble or poorly soluble, and in removing all or a part of the solvent (s) from the dyebath, as a liquid or vapor phase.

EXAMPLE 1

1 kg of unbleached polyamide fibers, 22 dtex in gauge and chopped into 5 mm lengths, were introduced into a bath circulation autoclave containing 10 liters of methanol, in which had previously been dissolved 20 grams of a terbium chelate fluorescent in the yellow-green when excited by ultraviolet rays (dimethylamine terbium benzoyl-trifluoroacetonate). This bath was made up with 10 liters of water and heated at 35 degrees Celsius for 45 minutes. The bath temperature was then gradually increased at 1° C./min up to 64° C. At this temperature, gradual removal of the solvent was then carried out by circulating the bath through a heated flask supporting a distillation column equipped with 32 plates and by returning the reflux from the flask, depleted in methanol, to the dye autoclave.

During this phase of removal of the solvent from the chelate the rates of circulation of the bath from autoclave to the flask and its return were adjusted as a function of the flask heating power, the capacity of the distillation column, and of the working pressure, and, in this way, the removal of all or a part of the methanol was produced in between 1 and 3 hours as a function of the above adjustments.

The fibers were withdrawn from the autoclave, separated from liquid and dried. When introduced into the paper pulp of a security paper, these fibers have made it possible to manufacture a security paper in which the fibers dyed according to the process of the invention exhibited, on the one hand, a fluorescence emission in the yellow-green when excited by UV rays and, on the other hand, under normal or artificial illumination had a color which did not enable them to be distinguished Cfrom the paper in which they were incorporated.

The proportions of rare-earth chelates are fixed as a function of the required fluorescence intensity, and the choice of the fluorescence emission range of the fibers dyed in this way (in the UV, the visible or the IR) is related to the choice of the rare-earth chelates employed.

The applicant has also found that good dyeing is obtained by using only one solvent in which the chelates are soluble.

EXAMPLE 2

A reel of polyester thread 1 kg in weight and of 125 tex gauge was introduced into a vat for dyeing reels, containing 20 liters of methylene chloride and 50 grams of the terbium chelate of Example 1.

The circulation bath was heated at 25° C. for 45 minutes and then, after its temperature was raised at 0.5° C. per minute, heated to boiling for 30 minutes. At this stage the bath exhaustion, without being complete, made it possible to produce a thread fluorescing under the same conditions as the fibers of Example 1.

In the second embodiment of dyeing security fibers using rare-earth chelates, this process consists basically in producing and carrying out the synthesis of the rare-earth chelate in the dyebath containing the fibers to be dyed, and consequently in the fibers to be dyed.

The example which follows illustrates, without implying any restriction, this second embodiment of the invention.

EXAMPLE 3

1 kg of cellulosic staple fibers of 27 dtex gauge and 5 mm in length is introduced for 30 minutes into a bath at 85° C. consisting of 20 liters of an aqueous solution of dimethylamine 4,4,4-trifluoro-1-phenyl-1,3-butanedione; an aqueous solution of-terbium chloride is then added in a stoichiometric quantity, which produces the synthesis of the corresponding chelate and its precipitation in the fibers. Withdrawn from the dyebath and dried, the fibers retain their initial whitish appearance, but are fluorescent in the green under UV rays as a result of the presence of the chelate precipitated in the fibers.

In this example, the aqueous bath may be replaced by a bath of water and solvent or pure solvent and reference may usefully be made to the literature which deals with the manufacture of rare-earth chelates.

The respective quantities of the chelating agents and of rare-earth salts are determined as a function of the nature of the chelate to be synthesized and of the luminescence intensity required in the fibers.

The working conditions of the dyebath are those usually employed in the dyeing of textile fibers, particularly insofar as the temperature and pressure are concerned, which are chosen as a function of the nature of the fibers to be dyed.

The fibers which may be employed according to the first or second embodiment of this invention may be natural, artificial or synthetic, and, without departing from the scope of this invention. It is possible to dye textile materials of the same nature as the fibers, as well as continuous filaments, films and natural, artificial or synthetic resins using one or other of these methods.

This dyeing process can also be applied to fibers of the first and second category, that is to say to fibers which are already colored (their color, for example yellow, being visible in sunlight or artificial light) which, after being dyed according to this invention, will exhibit a very advantageous property of an additional luminescent emission (in this example the yellow fibers will also have a green fluorescence under UV rays when they have been dyed with a terbium chelate according to one of the two processes described).

EXAMPLE 4

With all the components of Example 1 reproduced, 10 grams of the dye "ERIO 1% Orange AS at 100% strength" (Ciba-Geigy) were added to the 10 liters of water, in addition to the terbium chelate in the methanol. Fibres which were orange-colored under sunlight or artificial illumination and fluorescent in the yellow-green under UV rays, were thus obtained.

The applicant has also found that the luminescence of these rare-earth chelates is sensitive to the pH, being maximum at a neutral pH and diminishing gradually when the chelate environment departs from this neutral pH.

By exercising an accurate control over this decrease in luminescence, the applicant has thus produced either a new means of authentication, or a secret code, or a marking, for example, of the date of manufacture.

This new means of authentication has been produced by incorporating security fibers dyed according to the invention in a security paper made at an acid pH, and as a result of this the luminescence of the fibers has quickly disappeared. During the authentication test of this security paper, this paper was immersed in an alcoholic solution of the chelating agent which had been used to carry out the synthesis of the chelate employed for dyeing the fibers, and it was possible to authenticate this paper by the reappearance of the luminescence in the security fibers.

Conversely, it was possible to carry out another authentication test on a security paper manufactured at pH 7 and incorporating luminescent fibers according to the invention, by immersing it in an acid solution and noting the decrease in luminescence of the security fibers, which has permitted an advantageous authentication.

Since the decrease in luminescence of the fibers dyed according to this invention it proportional to the time of residence of the fibers in their acidic or basic carrier, this decrease may be used to produce a scale of the time elapsed relative to a carrier of neutral nature which may be used as reference if necessary. Using a security paper manufactured at an acid pH and containing the fibers of the invention, a security label was produced which was glued on products and whose luminescence decrease shows, for example, the expiry date, the end of the guarantee, or other limit dates. This marking, which constitutes a secret code and a time coding, can be applied particularly to transportation documents with restricted validity and generally to the production of documents or other materials which are of value only for a restricted period.

I claim:

1. A process for the manufacture of luminescent materials comprising:

(a) immersing a dyeable material in a liquid bath comprising (i) at least one luminescent rare-earth chelate, (ii) at least one solvent in which the rare-earth chelate is soluble and in an amount sufficient to dissolve the chelate and (iii) at least one diluent in which the chelate is insoluble or poorly soluble, the diluent being miscible with the solvent;

(b) removing at least a part of the solvent from the bath, the diluent being present in an amount sufficient to maintain the rare-earth chelate soluble in the bath; and (c) thereafter withdrawing the material from the liquid in the bath and drying it to obtain a material dyed with the luminescent chelate.

2. The process of claim 1 in which the materials are selected from the group consisting of fibers, threads, textiles, films and resins.

3. The process of claim 1 in which substantially all of the solvent is removed by heating the bath to vaporize the solvent before the material is withdrawn from the bath.

4. The process of claim 1 in which the bath also contains a color dye for the material.

5. The process of claim 1 wherein the rare-earth chelate is a chelate of yttrium, thorium or a lanthanide having an atomic number from 57 to 71.

6. The process of claim 5 in which the rare-earth chelate is terbium chelate.

7. The process of claim 1 in which the solvent is methanol or methylene chloride.

8. The process of claim 1 in which the diluent is water.

9. A process for the manufacture of luminescent material comprising;

(a) immersing a dyeable material in a liquid bath comprising a solution of a chelating agent;

(b) heating the bath for a time and at a temperature sufficient to dye the material with the chelating agent;

(c) adding a solution of a luminescent rare-earth salt that reacts exclusively with the dyed material by forming a luminescent chelated material; and (d) thereafter withdrawing the material from the bath and drying it to obtain a material dyed with the luminescent chelate.

10. The process of claim 9 in which the solution is an aqueous solution of the agent and the salt.

11. The process of claim 9 in which the rare-earth salt is a salt of yttrium, thorium or a lanthanide having an atomic number of from 57–71.

12. The process of claim 9 in which the material is selected from the group of fibers, threads, textiles, films and resins.

13. The process of claim 9 in which the material is first immersed in a heated aqueous solution of the chelating agent and an aqueous solution of a luminescent rare-earth salt is then added to the heated bath in stoichiometric quantity to form the luminescent rare-earth chelate.

14. The process of claim 13, in which the chelating agent is 4,4,4-trifluoro-1-phenyl-1,3,-butanedione.

15. The process of claim 1, wherein the dyeable material is a synthetic material.

16. The process of claim 15, wherein the synthetic material is selected from the group consisting of polyamide and polyester.

17. The process of claim 9, wherein the dyeable material is a synthetic material.

18. The process of claim 17, wherein the synthetic material is selected from the group consisting of polyamide and polyester.

* * * * *